(12) United States Patent
Bruwer et al.

(10) Patent No.: US 7,119,459 B2
(45) Date of Patent: Oct. 10, 2006

(54) INTELLIGENT SWITCH FOR CONNECTING POWER TO A LOAD

(75) Inventors: Frederick Johannes Bruwer, Paarl (ZA); Brandt Aucamp, Paarl (ZA); Abraham Carl Greyling, Paarl (ZA)

(73) Assignee: Azoteq (PTY) LTD, Paarl (ZA)

( * ) Notice: Subject to any disclaimer, the term of this patent is extended or adjusted under 35 U.S.C. 154(b) by 206 days.

(21) Appl. No.: 10/311,010

(22) PCT Filed: Jun. 13, 2001

(86) PCT No.: PCT/ZA01/00081

§ 371 (c)(1),
(2), (4) Date: Dec. 12, 2002

(87) PCT Pub. No.: WO01/97379

PCT Pub. Date: Dec. 20, 2001

(65) Prior Publication Data

US 2004/0021427 A1    Feb. 5, 2004

(30) Foreign Application Priority Data

Jun. 13, 2000  (ZA) ................. 2000/2958
Aug. 7, 2000   (ZA) ................. 2000/4007
Oct. 20, 2000  (ZA) ................. 2000/5861

(51) Int. Cl.
*H01H 3/26*   (2006.01)
*H02H 3/00*   (2006.01)
*H01J 7/24*   (2006.01)

(52) U.S. Cl. ............... 307/140; 307/139; 307/138; 361/71; 361/67; 361/68; 315/129

(58) Field of Classification Search ............ 361/71, 361/59–61, 67, 68, 72, 73; 315/291, 307, 315/129, 360, 86, 88
See application file for complete search history.

(56) References Cited

U.S. PATENT DOCUMENTS

| 2,338,078 A | 12/1943 | Wood |
| 2,630,517 A | 3/1953 | Hiscar |
| 2,784,290 A | 3/1957 | Ashton |
| 2,810,797 A | 10/1957 | Gulnick |
| 3,259,713 A | 7/1966 | Herridge |
| 3,535,282 A | 10/1970 | Mallory |
| 3,646,302 A | 2/1972 | Lehmann |
| 3,721,933 A | 3/1973 | Peroy |

(Continued)

FOREIGN PATENT DOCUMENTS

DE          3444178       6/1985

(Continued)

OTHER PUBLICATIONS

Operations and Maintenence Manual for ETERNALIGHT marketed by Technology Associates Inc., including email message from representative of Technology Associates Inc.

(Continued)

*Primary Examiner*—Tuyet Thi Vo
(74) *Attorney, Agent, or Firm*—Jones,Tullar&Cooper, P.C.

(57) ABSTRACT

A switching circuit includes a microchip which, in response to a signal from a signal switch, controls the operation of a power switch which, when closed, connects a load to a battery. The microchip can monitor the status of the battery and control the power switch to ensure optimum operation of the load and optimum usage of the energy in the battery. The microchip can control the connection of the load to the battery in different ways according to the manner of operation of the signal switch.

14 Claims, 6 Drawing Sheets

U.S. PATENT DOCUMENTS

| | | |
|---|---|---|
| 3,890,555 A | 6/1975 | Nelson |
| 3,944,804 A | 3/1976 | Wisdom |
| 4,001,803 A | 1/1977 | Lombardo |
| 4,071,805 A | 1/1978 | Brock |
| 4,074,252 A | 2/1978 | Keller |
| 4,122,371 A | 10/1978 | Talmage |
| 4,123,668 A | 10/1978 | Pecota |
| 4,228,484 A | 10/1980 | Johnstone |
| 4,237,526 A | 12/1980 | Wood |
| 4,282,681 A | 8/1981 | McCaslin |
| 4,293,894 A | 10/1981 | Blank |
| 4,306,277 A | 12/1981 | Bodde |
| 4,357,648 A | 11/1982 | Nelson |
| 4,385,258 A | 5/1983 | Voll |
| 4,403,172 A | 9/1983 | Sasaki |
| 4,408,182 A | 10/1983 | Hashimoto |
| 4,409,645 A | 10/1983 | Sloan |
| 4,414,611 A | 11/1983 | Seltzer |
| 4,442,478 A | 4/1984 | Stansvury |
| 4,467,263 A | 8/1984 | Conforti |
| 4,473,871 A | 9/1984 | Fuchshuber |
| 4,483,605 A | 11/1984 | Krumrein |
| 4,497,881 A | 2/1985 | Bertolino |
| 4,499,528 A | 2/1985 | Hawlitzki |
| 4,611,264 A | 9/1986 | Bradley |
| 4,623,957 A | 11/1986 | Moore |
| 4,638,174 A | 1/1987 | Bier |
| 4,686,609 A | 8/1987 | Dykstra |
| 4,716,902 A | 1/1988 | Swartz |
| 4,739,224 A | 4/1988 | Geerlings |
| 4,807,096 A | 2/1989 | Skogler |
| 4,866,345 A | 9/1989 | Kataoka |
| 4,875,147 A | 10/1989 | Auer |
| 4,876,632 A | 10/1989 | Osterhout |
| 4,908,649 A | 3/1990 | Matsui |
| 4,959,679 A | 9/1990 | Yamamoto |
| 4,962,347 A * | 10/1990 | Burroughs et al. ......... 320/114 |
| 4,963,793 A | 10/1990 | DePauli |
| 5,005,004 A | 4/1991 | Udofot |
| 5,027,037 A | 6/1991 | Wei |
| 5,047,688 A | 9/1991 | Alten |
| 5,055,268 A | 10/1991 | Martin |
| 5,057,383 A | 10/1991 | Sokira |
| 5,097,284 A | 3/1992 | Taniguchi |
| 5,114,376 A | 5/1992 | Copley |
| 5,130,901 A | 7/1992 | Priesemuth |
| 5,138,538 A | 8/1992 | Sperling |
| 5,174,643 A | 12/1992 | Priesemuth |
| 5,187,655 A | 2/1993 | Post |
| 5,206,097 A | 4/1993 | Burns |
| 5,206,562 A | 4/1993 | Matsuno |
| 5,226,711 A | 7/1993 | Matsuno |
| 5,254,907 A | 10/1993 | Matsuno |
| 5,304,896 A | 4/1994 | Asada |
| 5,309,145 A | 5/1994 | Branch |
| 5,317,362 A | 5/1994 | Takahashi |
| 5,321,309 A | 6/1994 | Kolomyski |
| 5,349,540 A | 9/1994 | Birkle |
| 5,357,169 A | 10/1994 | Toyozumi |
| 5,357,408 A | 10/1994 | Lecznar |
| 5,406,171 A | 4/1995 | Moody |
| 5,418,433 A | 5/1995 | Nilssen |
| 5,448,331 A | 9/1995 | Hamada |
| 5,469,346 A | 11/1995 | Haut |
| 5,491,383 A | 2/1996 | Leiber |
| 5,504,415 A | 4/1996 | Podrazhansky |
| 5,526,241 A | 6/1996 | Ferrel |
| 5,583,382 A | 12/1996 | Wagner |
| 5,604,407 A | 2/1997 | Andres |
| 5,604,999 A | 2/1997 | Barker |
| 5,611,720 A | 3/1997 | Van Der Maas |
| 5,645,341 A | 7/1997 | Liao |
| 5,647,657 A | 7/1997 | Damasky |
| 5,661,393 A | 8/1997 | Sengupta |
| 5,691,619 A | 11/1997 | Vingsbo |
| 5,736,696 A | 4/1998 | Del Rosso |
| 5,790,961 A | 8/1998 | Ingram |
| 5,806,961 A | 9/1998 | Dalton |
| 5,831,389 A | 11/1998 | Kawashima |
| 5,856,727 A | 1/1999 | Schroeder |
| 5,892,334 A | 4/1999 | Utzman |
| 5,895,989 A * | 4/1999 | Imaizumi et al. ........... 307/139 |
| 5,942,770 A | 8/1999 | Ishinaga |
| D417,019 S | 11/1999 | Rachwal |
| 6,000,807 A | 12/1999 | Moreland |
| 6,017,140 A | 1/2000 | Chou |
| 6,027,234 A | 2/2000 | Austin |
| 6,030,105 A | 2/2000 | Thau |
| 6,040,660 A | 3/2000 | Schmidt |
| 6,051,931 A | 4/2000 | Takei |
| 6,095,661 A | 8/2000 | Lebens |
| 6,129,446 A | 10/2000 | Hornung |
| 6,135,605 A | 10/2000 | Hsu |
| 6,140,776 A | 10/2000 | Rachwal |
| 6,152,590 A | 11/2000 | Furst |
| 6,164,806 A | 12/2000 | Schmickl |
| 6,179,453 B1 | 1/2001 | McMahon |
| 6,239,555 B1 | 5/2001 | Rachwal |
| 6,249,089 B1 | 6/2001 | Bruwer |
| 6,259,862 B1 | 7/2001 | Marino |
| 6,271,605 B1 * | 8/2001 | Carkner et al. ............. 307/125 |
| 6,441,584 B1 * | 8/2002 | Crass ........................ 320/131 |
| 6,621,225 B1 | 9/2003 | Bruwer |
| 6,650,066 B1 | 11/2003 | Bruwer |

FOREIGN PATENT DOCUMENTS

| | | |
|---|---|---|
| DE | 4127765 | 2/1993 |
| DE | 296 00 938 | 4/1996 |
| EP | 0323193 | 5/1989 |
| EP | 0 440 897 | 8/1991 |
| EP | 0 467 158 | 1/1992 |
| EP | 0 515 921 | 12/1992 |
| EP | 0 642 952 | 8/1994 |
| EP | 0 683 069 | 8/1995 |
| EP | 0 676 311 | 10/1995 |
| EP | 0 719 674 | 7/1996 |
| EP | 0 728 617 | 8/1996 |
| EP | 0 719 673 | 7/1997 |
| EP | 0 770 519 | 8/1997 |
| EP | 0 846 594 | 6/1998 |
| GB | 2243902 | 11/1991 |
| GB | 2276713 | 10/1994 |
| JP | 06-202231 | 7/1994 |
| JP | 08062681 | 3/1996 |
| JP | 10338028 | 12/1998 |
| JP | 11255017 | 9/1999 |
| JP | 11123985 | 5/2000 |
| JP | 11321455 | 7/2000 |
| WO | WO 97/00790 | 1/1997 |
| WO | WO 99/12781 | 3/1999 |
| WO | WO 99/20936 | 4/1999 |

OTHER PUBLICATIONS

Internet Website on Neon-Star Device, web address www.neon-net.com.tw/dataIII.htm.

Manresa, Elizabeth, "Light Lives Up to Promise," KYTV, (Springfiled, MO), Jul. 2000.

Web page form www.pocketgifts.com on Pal Survival Light.

Henry Schneiker, "Can You Patent an LED Flashlight?," (Jan. 2003).

International Search Report from PCT/ZA99/00107.

IDS's dated Nov. 25, 2003; Sep. 16, 2004 and Nov. 17, 2004 from U.S. Appl. No. 09/806,860.
Communication dated Dec. 9, 2004 citing settlement agreement in law suit involving US 6,621,225, Sep. 2003, Bruwer.

Forms PTO/892 listing refernces cited by Examiner during prosecution of U.S. Appl. No. 09/806,860.

* cited by examiner

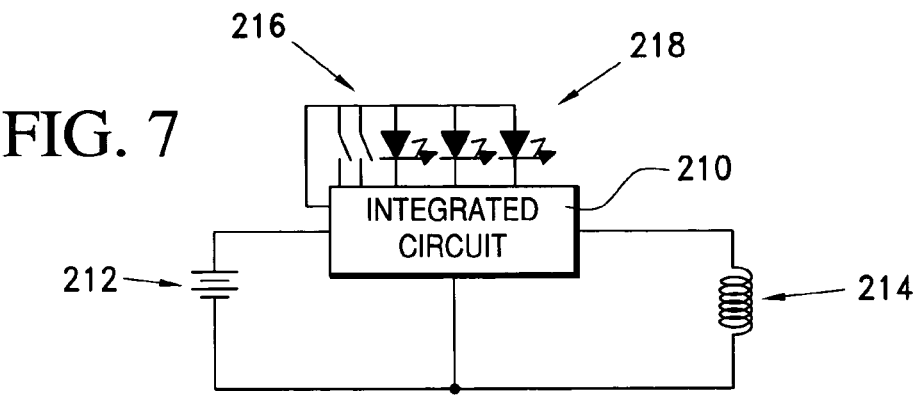
FIG. 7
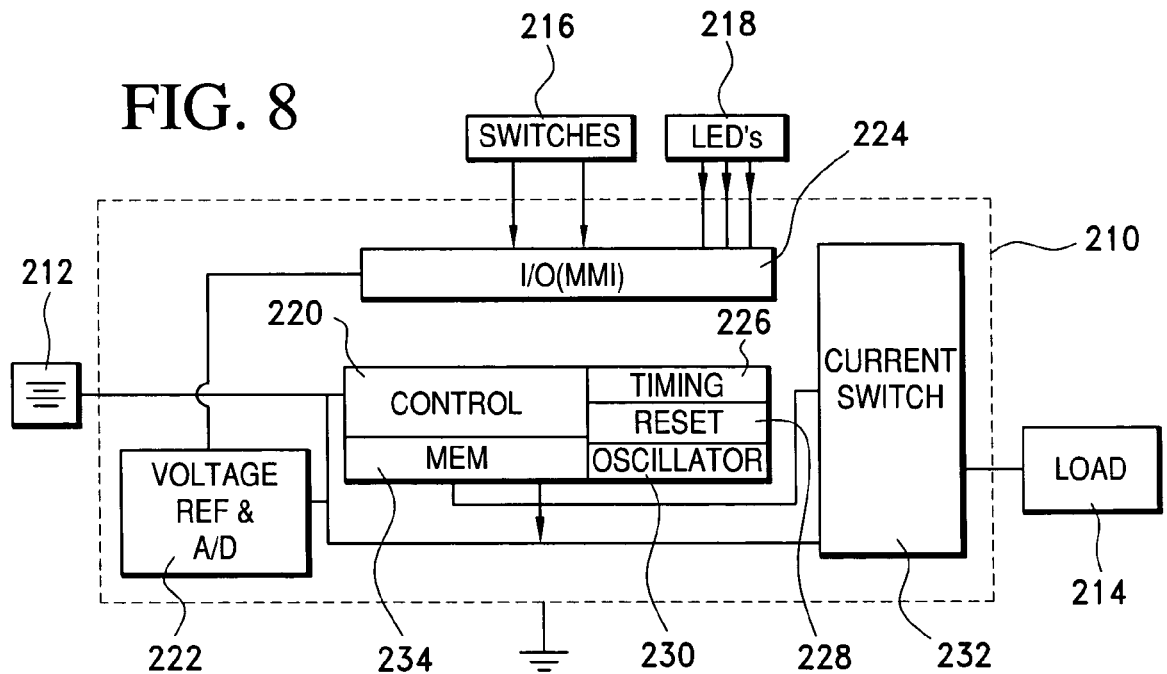
FIG. 8
FIG. 9
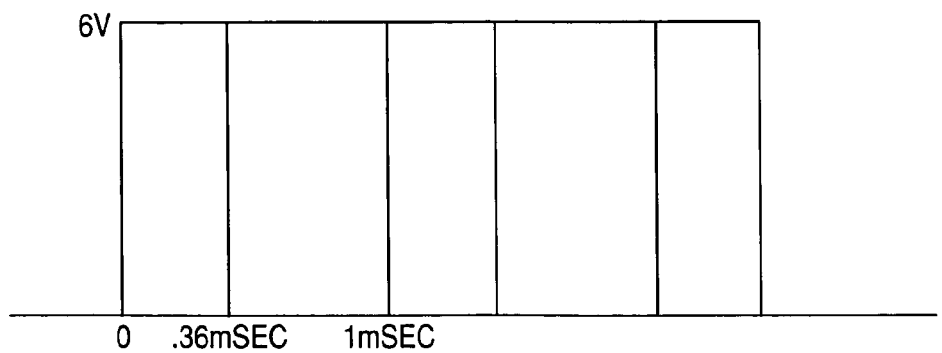

------- Duty Cycle
- - - - Voltage Error

INTELLIGENT SWITCH FOR CONNECTING POWER TO A LOAD

CROSS REFERENCE TO RELATED APPLICATIONS

This application is a national phase filing under 35 U.S.C. 371 of International Application No. PCT/ZA01/00081, file Jun. 13, 2001.

BACKGROUND OF THE INVENTION

The invention relates generally to an intelligent switch which is suitable for controlling the use of a battery driven device such as a flashlight, toy, motor or the like and, more particularly, is concerned with an intelligent electrical device of the kind described in the applicant's international application No. PCT/ZA99/00107.

In the PCT application mechanical switches function as a man-machine-interface ("MMI") between the device and an operator. The MMI functions are controlled by very low current signals using touch pads, carbon coated membrane type switches or similar mechanisms. A microchip is responsive to input signals from the MMI and can, according to application, be used in various ways. For example with a flashlight the MMI may control the on/off operation of the flashlight, cause the flashlight to be turned off after a predetermined time, provide an indication of battery strength, or enable the flashlight to be operated with a desired flashing sequence. Various other features can also be achieved through the judicious use of the microchip and reference is made to the specification of the PCT application for a further description of such features.

The applicant is aware of a number of systems which provide an indication of the charge left in a battery.

Osterhout et al (U.S. Pat. No. 4,876,632) describes a circuit which detects the closed circuit voltage of a battery pack used in a flashlight. Based on predetermined reference voltages the battery life is shown in one of three categories. The circuit is activated by an on/off switch of a flashlight and does not function when the flashlight is off. This is to ensure that there is no power consumption when the flashlight is off. If however the circuit should function when the light is off the open circuit voltage of the battery will be measured and this will give a misleading indication of the available battery life.

Mallory (U.S. Pat. No. 4,499,525) and Weber (U.S. Pat. No. 5,821,697) relate to the provision of constant illumination by flashlights. Much can be gained in terms of quality of light and operating life of light bulbs by maintaining constant power through a light bulb. It is to be noted that in most instances the voltage which is supplied by a battery varies quite extensively over its usable life. Mallory makes use of an RC filter to determine an effective current and time measurement. Based on component selection the duty cycle of a current delivered to a light bulb at a specific voltage can be determined.

Weber uses a different technique wherein power is dissipated in a variable resistor or transistor element. This approach is wasteful of power.

SUMMARY OF THE INVENTION

The present invention is concerned with various modifications and improvements which can be made to the microchip and to the embodiments of the invention described or claimed in the specification of the PCT application. To the extent which may be necessary for an understanding of the present invention the disclosures in the specification of the PCT application are to be read in conjunction with this specification and, where applicable, such disclosures are to be deemed to be incorporated into this specification.

According to a first aspect of the invention there is provided a switching circuit for controlling the supply of power from an exhaustible power source to a load, which includes a control circuit, a power switch which is controlled by the control circuit and which, when closed, connects the power source to the load, and at least one signal switch which is connected to the control circuit, and wherein the control circuit provides at least one function selected from the following:

(a) the control circuit causes the power switch to be operated in a manner which is dependent on the operation of the signal switch, (b) the control circuit compares the voltage of the power source, when the power source is connected to the load, to at least one reference voltage thereby to provide an indication of the status of the power source, (c) the control circuit monitors the voltage of the power source and when the power source voltage drops below the operating voltage of the control circuit, the power switch is controlled by the signal switch to connect the power source to the load, (d) the control circuit monitors the voltage of the power source and the power switch is latched on or off, according to requirement, when the power source voltage drops below the operating voltage of the control circuit, and (e) the control circuit controls the duty cycle of the power switch, in a manner which is dependent on the voltage of the power source, to provide a substantially constant supply of power by the power source to the load.

A specific sequence of operations of the signal switch may be interpreted to provide for the application of power to the load for an indefinite period, ie. effectively permanently, until terminated according to a different criterion.

In another embodiment if the signal switch is held on for an extended period the power switch may be operated in such a way that a dimming or reduced power operation results.

In a variation the power switch is closed for a predetermined period which is a function of the duration of a time period for which the signal switch is operated.

According to a second aspect of the invention the control circuit includes the ability to monitor the voltage level of the exhaustible power source (ie. a battery) which is connected to the load and when the voltage level drops below the operating voltage of the control circuit an input signal from an input switch to the control circuit is used directly to control the application of power from the battery to the load. It follows that, although the control circuit will be disabled and will not exhibit all its design functions when the battery voltage is too low, the control circuit is nonetheless capable of allowing the maximum extraction of energy from the battery, when required. This can be done without voltage sensitive parts (eg. oscillator and control or decision making logic) of the circuit being operational.

The switching circuit may include a comparison unit for comparing the voltage of the power source, when the power source is connected to the load, to at least one reference voltage thereby to provide an indication of the status of the power source.

The voltage which is compared to the reference voltage is thus the closed circuit voltage of the power source.

The switching circuit may include at least one light emitting device which is energised to provide a visual indication of the said power source status.

The switching circuit may include a memory unit for storing a measure of the voltage of the power source, particularly the closed circuit voltage. This facility means that an indication of the status of the power source is available even though the power switch is open.

The switching circuit may include a measuring unit for measuring the open circuit voltage of the power source, ie. when the power switch is open, and the comparison unit may be adapted for comparing the open circuit voltage measurement to the closed circuit voltage of the power source, and for providing a signal if the open circuit voltage drops below the previously measured closed circuit voltage.

The said reference voltage may be stored in the memory unit. Preferably two or more reference voltages are stored in the memory unit.

The control circuit, in response to the closed circuit voltage of the power source, may control the power switch in order to vary the duty cycle of the current which is passed to the load to achieve a substantially constant power supply to the load.

Preferably in the case in which light emitting devices are used to provide a visual indication of the said power source status at least one of the said light emitting devices is used to act as a find-in-the-dark indicator by causing the said light emitting device to flash at a very low duty cycle, at the same time continuously showing the battery status.

After the circuit has been powered up or down the memory unit may be reset with a fresh measurement of the prevailing open circuit voltage or of the closed circuit voltage of the power source. The control circuit may be adapted to close the power switch automatically and for a short period of time for obtaining a closed circuit voltage measurement of the power source. This can be done for example once every 24 hours.

According to a variation of the invention the power switch is latched on or off, according to requirement, when the power source voltage is too low to cause normal operation of the control circuit ie. when the control circuit enters a non-functioning or reset state which is dependent on the battery voltage.

According to a different aspect of the invention if the switching circuit includes a first signal switch for on/off selection and a second signal switch which selects a plurality of functions then the second signal switch may be enabled to provide an "off" command to the control circuit, and hence of the load which is connected to the control circuit, if the second signal switch is activated a predetermined period (eg. 2 seconds) after the last operation of the second signal switch or first signal switch.

According to a further aspect of the invention the control circuit may include a voltage regulation capability which provides a regulated voltage through the power switch to the load.

The switching circuit may include a timer which controls the said predetermined period and wherein the timer is reset each time the signal switch is operated.

The control circuit may include an input pin or contact to which an input signal is applied from the signal switch. This may take place in any appropriate way eg. by activating the signal switch which is connected to the input pin or contact. Alternatively the control circuit may detect activity by a user in any other appropriate way eg. by monitoring activities at or to all input terminals to the control circuit and, each time an activity is detected, resetting the counter or timer. Thus the delayed switch-off function will only occur if no activity is detected for the full duration of a predetermined period (prior to the switch-off function).

The switching circuit may include a first signal switch which is connected to an edge triggered input of the control circuit and a second signal switch which is connected to a state triggered input of the control circuit and wherein a signal input by the first signal switch causes the power switch to change from a state previously determined by a signal input from the second signal switch, and a signal input by the second signal switch does not cause the power switch to change from a state previously determined by a signal input from the first signal switch.

In this specification the phrases "control circuit" and "microchip" are used interchangeably.

BRIEF DESCRIPTION OF THE DRAWINGS

The invention is further described by way of examples with reference to the accompanying drawings in which:

FIG. 7 is a block diagram representation of a circuit according to the invention for controlling the supply of power from a battery power source to a load which, in this case, is a lamp, FIG. 8 is a more detailed representation of an integrated circuit (microchip) used in the circuit of FIG. 7, FIG. 9 is a representation of a typical modulated signal which is delivered by the circuit of FIG. 8 to the load.

DESCRIPTION OF PREFERRED EMBODIMENTS

Figure 1:
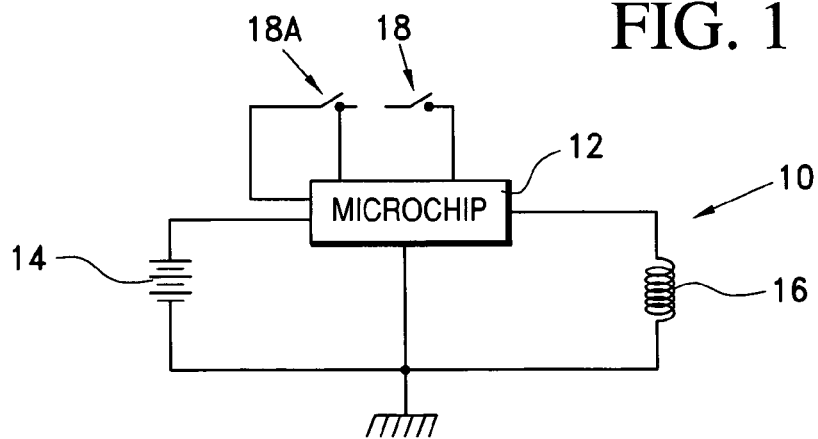
FIG. 1 is a block diagram illustrating the use of a microchip for controlling an electrical load in accordance with the principles of the invention.

FIG. 1 of the accompanying drawings schematically illustrates a switching circuit 10 which includes a microchip or control circuit 12, a battery 14, a load 16, and a signal switch 18.

The arrangement shown in FIG. 1 is similar to what has been described in the specification of international application No. PCT/ZA99/00107 and, for a detailed description of the operation of the arrangement, reference is made to the specification of the international application.

The switch 18 functions as an interface between an operator or any appropriate actuating mechanism, and the control circuit 12, and hence is referred to as a man-machine-interface (MMI) This term is however adopted merely for the sake of convenience for, as noted, the switch could be operated by human intervention or by any mechanism eg. a closing door or other device which acts on the switch. The control circuit 12, in response to signals input from the MMI, causes power to be applied from the battery 14 to the load 16. The load may vary according to application and for example may be a light bulb, a heater or the like.

Figure 2:
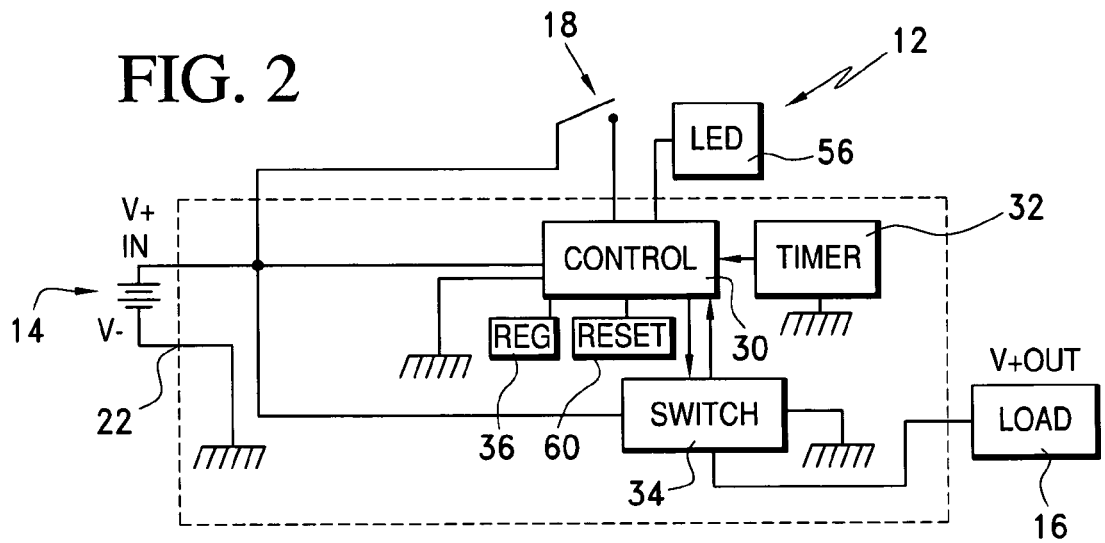
FIG. 2 illustrates typical components of the microchip.

FIG. 2 illustrates internal components of the control circuit 12. Voltage from the battery 14 is applied to terminals 22 and the switch 18 controls the application of power to a control circuit or unit 30 inside the circuit 12. The circuit 12 additionally includes at least a timer 32, a power or load switch 34 and, optionally, a voltage regulator 36.

In general terms the control unit 30, in response to a signal from the switch 18, causes operation of the power switch 34 and thereby connects the battery 14 to the load 16, or disconnects the battery from the load. The power switch 34 may or may not be part of a combined integrated circuit with the signal switch.

Figure 3:
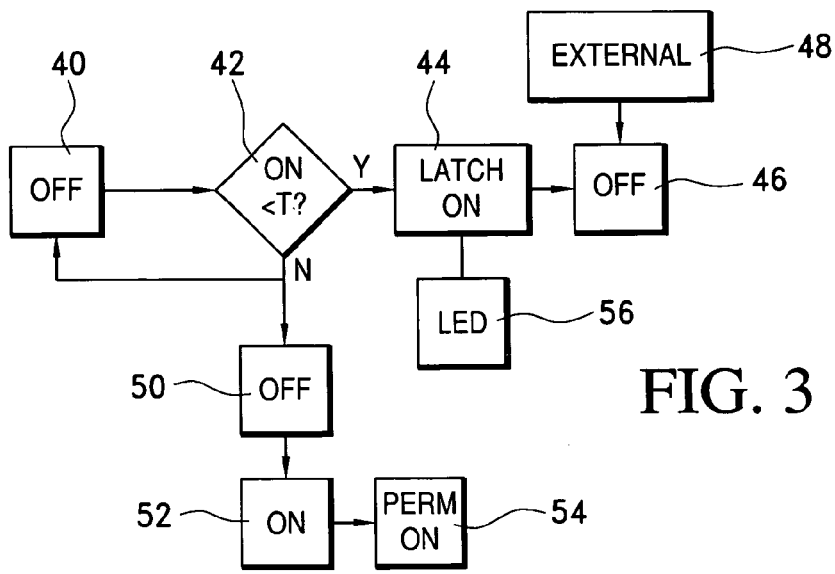
FIG. 3 is a simplified flow chart of a sequence of operations which can arise during the operation of the microchip.
Figure 4:
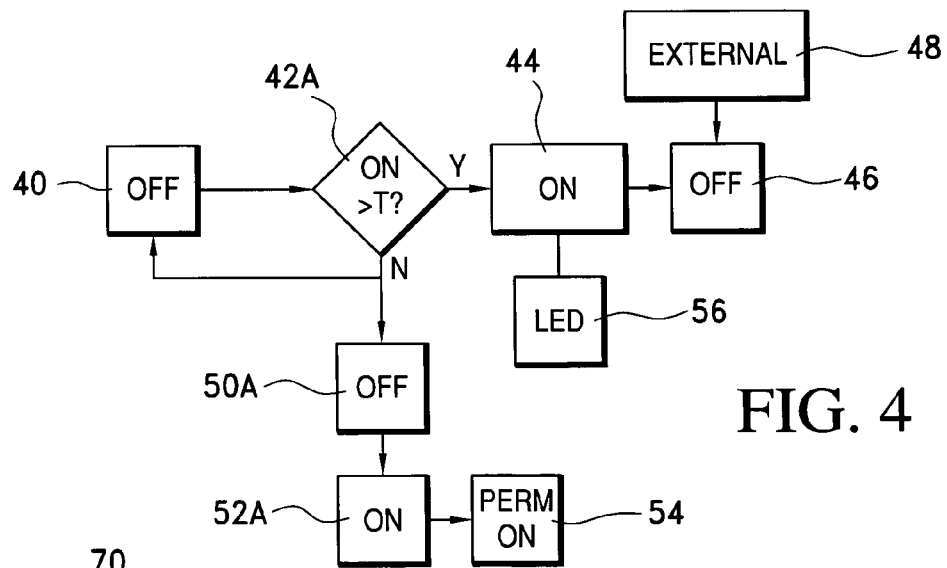
FIG. 4 is a flow chart, similar to FIG. 3, of a slightly different sequence of operations.

The switch 18 may vary in its construction and for example, may be a push button switch ie. of momentary actuation, or a slide switch ie. on or off (in two stable states). If the control circuit 12 is fabricated separately from the switch then, in advance, the nature of the switch with which the control circuit 12 is to be used may not be known. FIGS. 3 and 4 illustrate different flow charts which arise through different phases of operation of the microchip of the invention with different respective switch types.

Assume that the control switch 18 is a push button, ie. a push-to-make and release-to-break, switch. Referring to FIG. 3, from an off state 40, if the switch is operated to make contact for less than a predetermined time interval T, say less than 0.5 seconds (step 42), then the switch is regarded as a push-to-make switch and the power is latched on (step 44). To switch the power off (step 46) contact must again be made or, alternatively, switching off can be initiated by a function of the microchip eg. auto shut-off. These aspects are indicated by means of a block 48 labelled "external".

FIG. 4 illustrates a sequence of operations for a slide switch, ie. for push-to-make and push-to-break operation. In this case, from an off state 40, if contact is made for more than a period T of, say, 0.5 seconds, (block 42A), the switch is regarded as a slide switch and power is kept on (44) until turned off (46) by means of an external mechanism 48, eg. auto shutoff or operation of the switch.

The aforementioned type of operation, with both switch types, is highly desirable under certain conditions for example in the case of a flashlight which is hand held by a law enforcement officer. Typically two distinct functions are required. The first is to have the light switch on while scanning an area. In this case currently available products provide a push-to-make type of button and the light is on while the button is pushed and goes off immediately upon release. Clearly one hand is occupied full-time to have the light on.

Secondly, to switch the light on for an extended period of time, a twisting operation is required. The front or back end of the flashlight is, in some cases, turned to have a slide-switch action. This normally requires the use of two hands which may not be convenient.

The present example of the invention provides an elegant solution to this type of situation. A momentary press on the switch causes the flashlight to be turned on for an extended period. Thus single hand operation can be resorted to. The light shines until the button is again pushed or auto shut-off occurs. This can be very convenient for an officer holding a gun in one hand and wanting to switch his flashlight on for an extended period of time.

Permanent-on selection can easily be accommodated. In this case an override of the auto-shut off procedure is needed. This can be provided by stipulating that a on-off-on action within a short period, say within two seconds, is interpreted by the control unit 30 as a permanent-on mode selection. In other words three presses on a push button or three slides of a slide switch will be interpreted as being permanently on. The sequences are indicated in FIGS. 3 and 4 respectively by the steps 42, 50 and 52 and 42A, 50A and 52A respectively, resulting in each case in a permanently on state 54.

The mode selected is indicated for example by means of a visual display device such as a light emitting diode 56. The LED may also be used as a find-in-the-dark facility. For example a single flash every two seconds on this indicator can indicate an on state with auto shut down in operation. Two flashes in quick succession with a delay of approximately two seconds before the next two flashes may indicate a permanent on mode. More flashes in quick succession with a delay before the next flashes may indicate other selected modes.

An important aspect of the invention is operation in a low voltage region. A flashlight or toy (ie. the load 16) operating from the battery 14, will encounter a situation in which the battery is depleted. Often the battery runs down gradually with its voltage level slowly dropping. Typically the voltage may be within the operational specification of the microchip or control circuit 12 and then it will slowly deplete and drift out of specification.

It is desirable, under certain conditions, to give the user as much use as possible from a set of batteries and also to try and match the performance of a mechanical switch which is not normally voltage dependent or responsive.

The microchip 12 is, in accordance with an aspect of the invention, supplied with a reset circuit 60 (see FIG. 2) which functions in a manner which is known in the art. Below a certain voltage threshold the reset circuit 60 keeps the microchip 12 in a reset or non-functioning state. Above the threshold voltage the reset circuit 60 allows the control circuit 12 to operate in accordance with its design requirements.

In the present case a reset signal, produced by the circuit 60, is used to connect the signal from the switch 18, ie. from the MMI, directly to the power switch 34 when the circuit is in a reset state. In such a state the power switch conducts current when the MMI switch is closed.

The effect of this is that the auto shut off and other functions are disabled when the voltage of the battery 14 is below design specification. If a push-to-make switch is used to select the on state with a single short push, the power is turned off when the reset circuit turns on. In a flashlight example however the user is able to shine the light, although it is very dim, by keeping the push button depressed.

In the case of a slide switch the auto shut off and other functions are again disabled at the time the reset circuit turns on but, with the flashlight in an on state, the flashlight stays on as the battery 12 gets fully depleted. The flashlight will switch off once the slide switch is moved to a non-contact position. The find-in-the-dark and similar functions are disabled since the relevant portion of the microchip is not operational when the reset circuit 60 is turned on.

In other embodiments the power switch 34 may be latched on/off when a reset state is entered. Latching on may be important in cases when continuous operation to the lowest possible voltage is required eg. with a flashlight. An off selection may be important in a case where a voltage which is too low may damage the product eg. with an electric motor.

Figure 5:
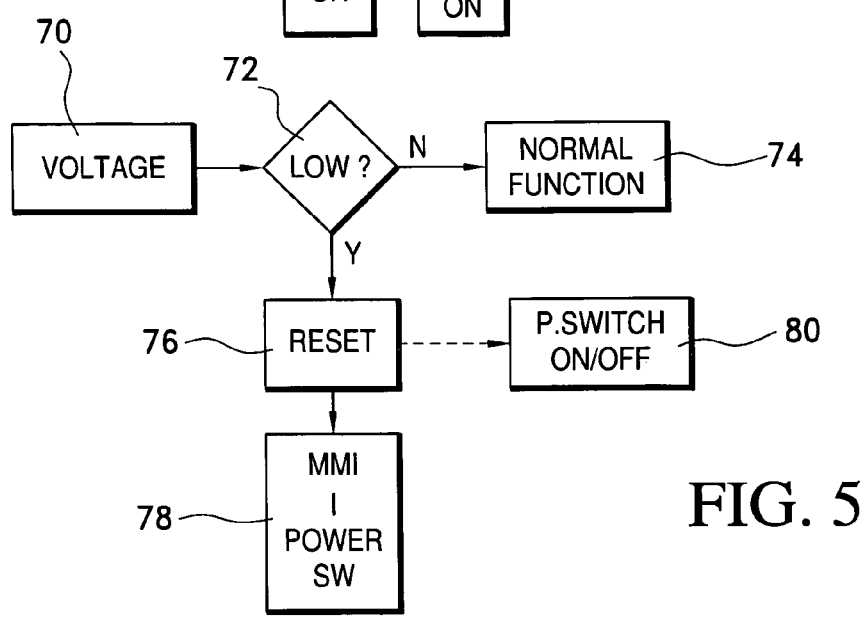
FIG. 5 is a flow chart illustrating operation of the microchip under a different set of conditions.

FIG. 5 illustrates, in flow chart form, the aforementioned sequence of operations. The voltage 70 of the battery 14 is monitored (step 72). If the voltage is within specification then the control circuit 12 functions normally (step 74). If the voltage drops below specification then the reset circuit 60 detects this (step 76) and the power switch 34 is then made directly responsive to the MMI switch 18 (step 78). Depending on requirement and in particular on the nature of the load 16 the power switch 34 can be latched on or off (step 80)

Assume that the control circuit 12 is responsive to the switch 18 and to a second switch 18A shown in dotted lines in FIG. 1. In other words the MMI has two signal switches. The first switch may for example may be used for on/off selection while the second switch may be used to select the mode of operation and, when pressed, may step sequentially through various modes such as a first level of dimming, a second level of dimming, fast flash, slow flash, etc, in a cyclical manner.

A user may get confused with the two switches. Assume for example that a dimming mode is selected and operated for a period of time. If the user wants to switch the flashlight off but inadvertently presses the mode switch 18A instead of the first switch 18 the flashlight again starts flashing. This may be bothersome and confusing for some users. Under these conditions the control unit 30 may detect operation of the mode selection switch 18A, when operated after a predetermined period of, say, 10 seconds, and change its function so that such operation results in an off function ie. the load 16 is disconnected from the battery 14.

In another embodiment of the invention the control circuit 12 includes a voltage regulator 36 This is used to provide a regulated voltage, derived from the battery 14, to the load 16. This may be highly desirable under certain conditions for it can be used to prevent an overshoot of the voltage, applied to the load, when the switch 34 is turned on and can enable much longer operation at an optimal voltage.

Assume for example that a flashlight operating from a 6V battery pack has an output from the current switch regulated to 4.5V. As the battery gets depleted from its initial 6V the light will have optimal and constant performance until the battery voltage drops to 4.5V. When the battery voltage drops below this level the current supply to the load will gradually diminish and will continue to diminish until the battery is totally exhausted. This feature helps in the design and choice of bulb for use in the flashlight and also helps to improve the life span of the bulb.

In a further embodiment the switch can provide for flashlight operation at a regulated voltage, for example a four cell flashlight (6V) may be regulated to work at 4V with a suitable bulb for the 4V output. If the user wants to have brighter light for a short period, the unregulated voltage can be applied to the bulb or, if the voltage has dropped, a step-up can be performed to yield a very bright light.

The invention is frequently described herein with reference to the operation of a light bulb. It is to be understood that this is only by way of example and that the invention can be used with any other load eg. a heater, motor or any other electrical device.

Figure 6:
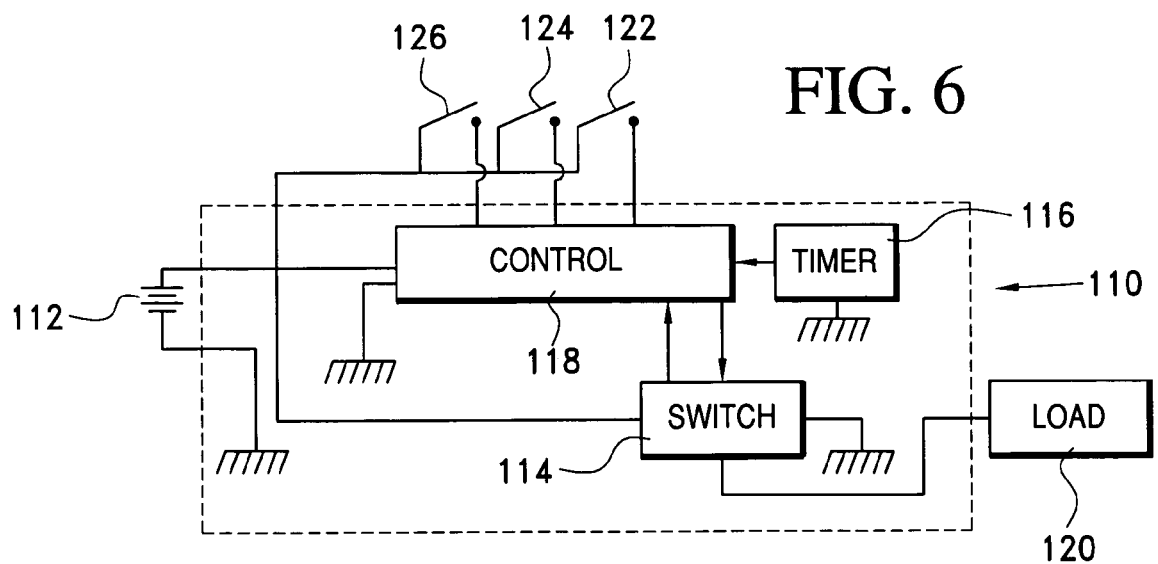
FIG. 6 illustrates a variation of the invention.

FIG. 6 of the accompanying drawings illustrates a microchip 110 according to another form of the invention which is supplied with electrical power from a source 112. The microchip includes a power control switch 114, a timer 116 and a control circuit 118. A load 120 is connected to the microchip. The switch 114, under the control of the control unit 118, controls the connection of the power source 112 to the load 120 in accordance with various criteria.

A switch 122 is used to turn the microchip on or off. This switch gives to the user overall control of the microchip so that the microchip can be enabled or disabled.

An optional second switch 124 is used as a mode selector switch. This enables a user to select different modes or functions of the microchip so that the load 120 is controlled, or caused to operate, in a different way.

The drawing illustrates a third switch 126 which is referred to as an activity detector switch. Although shown as a switch this could, in some situations, be a symbolic notation only for activity of the user could be detected in any appropriate way by making use of any suitable monitoring system.

The switch 126, which is used to detect activity, can be one of a number of switches which are used to control operation of the control unit 118. Alternatively the switch 126 can be operated in a particular way or sequence to provide different command signals to the control unit 118 so that the control unit can function according to requirement.

Assume for example that the load 120 is an animated toy or similar device which is powered by the power source 112 in a manner which is determined by the operation of the switch 126 and, where appropriate, by the switch 124. Each time the switch 126 is activated the timer 116 is reset. Thus the switch 114 will remain closed and the load 120 will be energised while there is activity at the switch 126. Once the activity ceases the timer 116 starts its timing period. If, during this period, there is no activity at the switch 126 then the timer 116 will complete its timing period and, at the end thereof, will cause the switch 114 to open circuit. In other words the delayed switch-off function will be implemented a predetermined period, which is determined by the timer interval, after the last activity is detected by the control unit 118.

Any appropriate means may be used for detecting activity relating to the microchip. As stated, the switch 126 may be operated in a variety of different ways in order to exert different control functions or, alternatively, the switch 126 may be one of a plurality of similar switches each of which exerts a respective control function. Depending on the protocol a switch which is opened or closed, can be detected as activity. Thus the timer could be reset by a high input signal, a low input signal or a transition signal in a chosen direction eg. low-to-high, or high-to-low, or any combination thereof.

FIG. 7 of the accompanying drawings illustrates a circuit 210 for controlling the supply of power from a battery power source 212 to a load 214. The nature of the load may vary from case to case. In the following description the load 214 is described as being an electric light bulb but this is given merely by way of a non-limiting example.

A number of signal switches 216 are connected to the circuit and are used for controlling its operation. A number of light emitting diodes 218 are connected to the circuit 210 and are used for indicating certain aspects of the operation of the circuit and for providing an indication of the status of the battery 212, in the manner which is described hereinafter.

FIG. 8 is a more detailed block representation of the circuit 210. The circuit 210 is an integrated circuit and includes a control unit 220, an analogue to digital converter 222, an input and output unit 224 which functions as an interface, timing, reset and oscillator modules 226, 228 and 230 respectively, a current switch 232 and a memory module 234.

The switches 216 are used for actuating the control unit 220 through the medium of the input and output unit 224 Selected information generated by the control unit 220 is transferred to the light emitting diodes 218 through the medium of the input and output unit 224.

The voltage from the power source or battery 212 is measured and converted to a digital format by the analogue to digital converter 222. The converter also detects whether the current switch 232 is opened or closed when the battery voltage is measured and, in this way, is capable of providing a digital measurement of the open circuit voltage or the closed circuit voltage of the battery 212.

Once the input voltage has been digitally measured its value, referred to as $V_D$ herein, is transferred to the control unit 220.

Pre-programmed reference voltages are stored in the memory module 234. The number of reference voltages which are stored is determined by the number of categories in which the battery voltage can be classified. For example a three category indication of good, medium and bad requires at least two reference values $V_G$ and $V_M$. The battery indications are as follows depending on the relative voltage levels:

$V_D \geq V_G$—"good" indication;
$V_G > V_D \geq V_M$—"medium" indication; and
$V_D < V_M$—"bad" indication.

By actuating a selected switch 216 the control unit 220 is caused to operate, substantially in the manner which is described in the specification of international application No. PCT/ZA99/00107, and the switch 232 is closed thereby to connect the battery 212 to the load 214. As indicated the battery voltage is measured and compared to the reference voltages stored in the memory module 234. An indication is then substantially immediately given of the status of the battery via the appropriate light emitting diode or diodes 218 which are activated in a predetermined manner.

The measurement of the closed circuit voltage of the battery can be stored in the memory module 234. When the battery is disconnected from the load the open circuit battery voltage can be measured automatically by the action of the control unit, at regular intervals, and compared to the closed circuit voltage stored in the memory module 234. If the open circuit voltage drops below the stored value of the closed circuit voltage the category (good, medium, bad) in which the battery is classified can be altered to reflect the change in the battery condition.

The timing unit 226 is used to control the intervals at which the battery voltage is measured and for controlling the frequency at which the light emitting diodes 218 are pulsed. It is to be noted that when the switch 232 is open at least one of the diodes 218 may be pulsed at a very low duty cycle, which is controlled by the timing unit 226, to provide a find-in-the-dark facility. The low duty cycle ensures that the power consumption of the flashing LED is kept to a low value.

Figure 11:
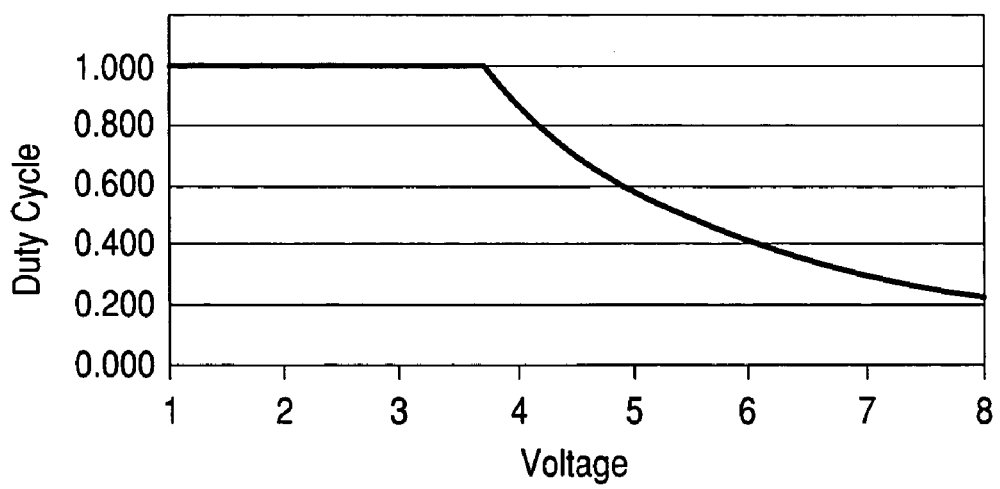
FIG. 11 is a graphical representation of a duty cycle as a function of voltage for a 3.6V bulb.

The control unit is capable of modulating the power supply, under appropriate conditions, to ensure that the power which is supplied to the load 214 is kept substantially constant as the battery voltage drops due to power consumption. Assume for example, as is shown in FIG. 11, that the voltage of the battery 212 is initially at 8V and that the load 214 is a 3.6V bulb. As the battery voltage drops due to the charge in the battery being diminished through usage the duty cycle of the power supplied to the load increases. In the range of from 8V down to 3.6V, the duty cycle is non-linear with respect to voltage and, once the voltage crops to 3.6V, the duty cycle is 100%.

In the case of a light bulb it is important to note that the light bulb will give substantially constant illumination if its average power consumption is constant. FIG. 9 illustrates a way in which the battery voltage can be modulated or switched by the oscillator 230 acting directly or indirectly on the current switch 232. In this instance, with the battery voltage at 6V, pulses with a duration of approximately 0.36 ms are generated at a frequency of approximately 1 kHz which is controlled by the oscillator unit 230.

Apart from errors based on resolution it is only after the battery voltage drops below 3.6V that the light bulb illumination starts to degrade. The acceptable margin for error determines the accuracy required for measuring the voltage across the battery as well as the resolution with which the duty cycle can be constructed.

Figure 12:
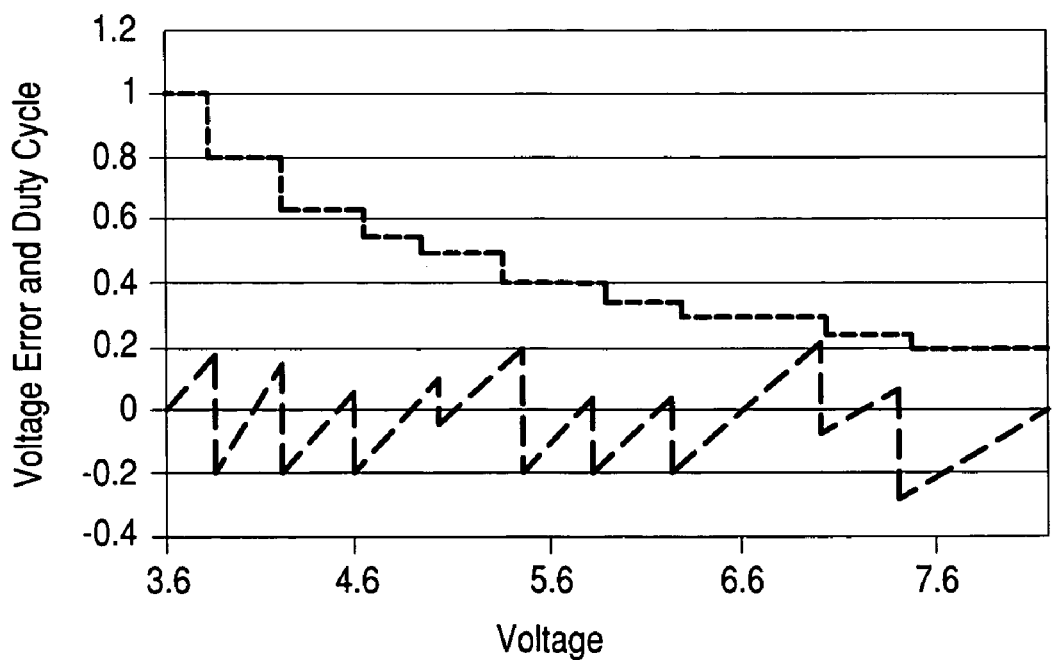
FIG. 12 shows voltage error and duty cycle curves respectively as a function of power source voltage.

FIG. 12 shows a graph of the error levels caused by digital rounding if the battery voltage ($V_D$) is measured to an accuracy of 0.4V and a 5% resolution is used for the duty cycle construction. Clearly this accuracy is a function of complexity and cost, and can be increased within practical limits.

The functions of battery status and constant illumination require a voltage measurement of the closed circuit voltage of the battery ie. when the load is connected to the battery. From a cost and implementation perspective these functions are logically provided by the integrated circuit 210. On the other hand if the product with which the circuit is used, eg. a flashlight, has a find-in-the-dark feature, eg. an LED which flashes at a low duty cycle, then it stands to reason that the battery life indication can be provided by the find-in-the-dark (indicator to reduce the component count.

The effect of constant illumination can also be achieved by stepping up the input voltage to a higher voltage level. This can be implemented by using various DC-to-DC step-up converter techniques which are known in the art. The advantage of a step-up approach means that higher illumination levels are achievable than what would otherwise be the case when the battery voltage drops. This however would be at the cost of additional components. One can also make use of a step down converter to achieve substantially constant illumination.

The switching rate of the switch, ie. the modulation rate of the power supplied to the load, must be such as to avoid overheating during the on part of the cycle and to prevent flickering occurring which is visible to the human eye. On the other hand with every switching action some power losses occur. Thus lower modulation frequencies are more efficient and components are more feasible. For Xenon bulbs a 1 kHz switching rate appears to be a good compromise.

Figure 10:
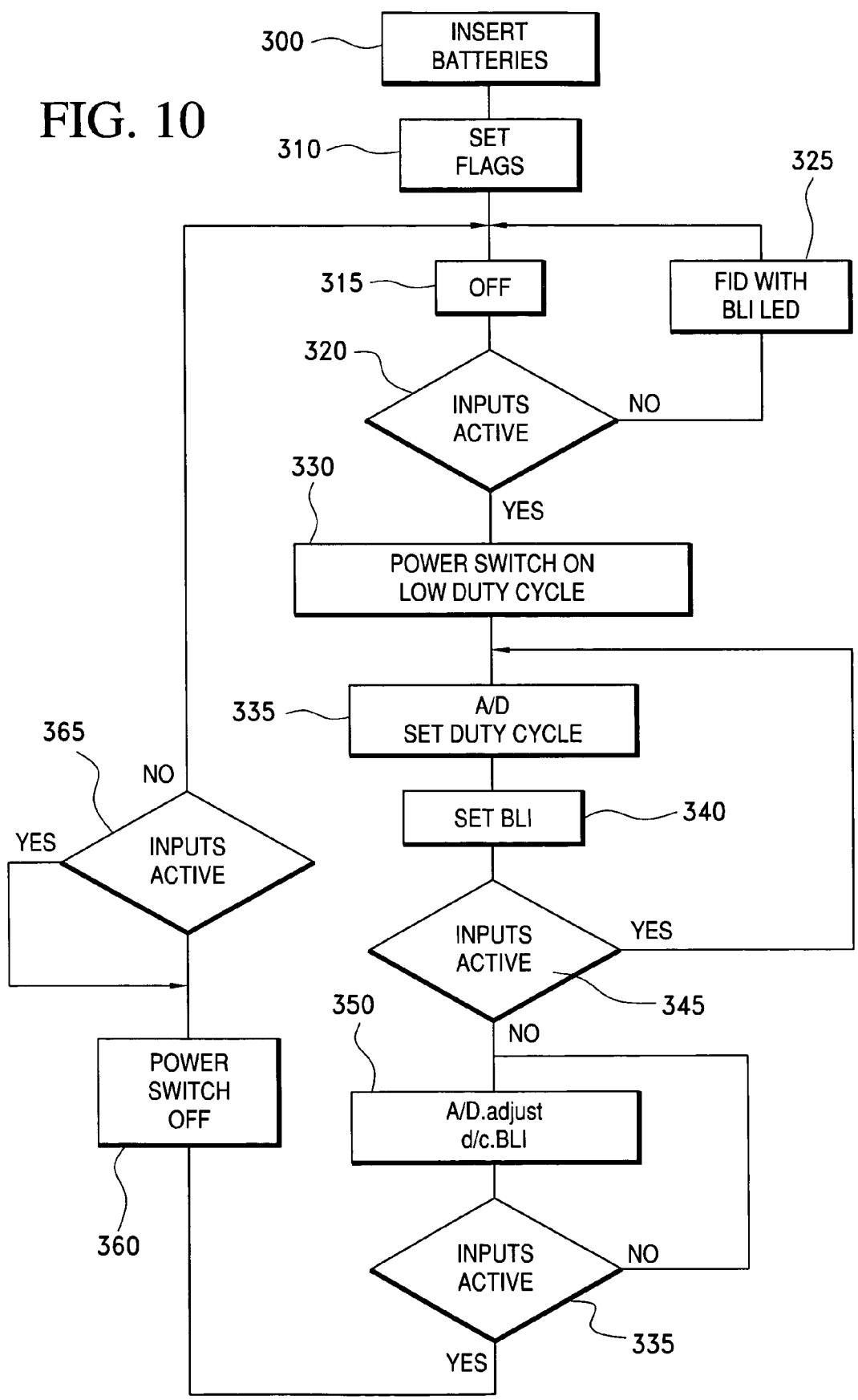
FIG. 10 is a flow diagram representation of certain steps in the operation of the circuit of FIG. 8.

FIG. 10 is a simple flow diagram representation for the on/off function of a flashlight with a continuous indication of battery status.

When the batteries are inserted into the flashlight (300) flags in the control unit are set (310). At this stage the circuit 210 does not have information about the battery status and the open circuit voltage of the battery must be measured. Optionally the flashlight is momentarily turned on to measure the closed circuit voltage. This enables the battery life indicator flag (BLI flag) to be set in accordance with the measured voltage.

A block 315 indicates that the load is switched off at this time.

If a find-in-the-dark (FID) function is implemented the integrated circuit 210 causes the corresponding LED (good, medium or bad) to flash even though the bulb 214 is not illuminated (325).

Upon user activation (320) the inputs 216 to the circuit 210 become active. Within normal state of the art practices like debouncing etc. the control unit 220 turns the current switch 232 on. In order to protect against overheating the calculation of the correct duty cycle for the applicable input battery voltage must be made faster than the lowest duty cycle, or the duty cycle must be set to its lowest (safest) level (330), so that the duty cycle calculations can be done. Thereafter the correct duty cycle, which determines the illumination of the bulb 214, can be selected (335).

Once the closed circuit voltage has been measured and converted the resulting digital value $V_D$ can be compared against reference values in order to categorize and indicate the status of the battery (340) (BLI=battery life indicator).

The control unit 220 performs the functions up to step 345 in a short time. A check is constantly required (step 345) to see if the user has released the appropriate input switch 216. If not the steps 335, 340 and 345 are repeated. The input switch 216 is monitored more actively than the voltage levels in order to conserve power. Once the release of the input switches has been detected (345) the control unit 220 proceeds to check the voltage levels to adjust for a possible drop in supply voltage (350) and to check the input switches 216 (355) for a terminate command. If a terminate command is received the control unit 220 turns the current switch 232 off (block 360).

Upon the subsequent release of the input switch 216 by the user the control unit 220 again checks the input switches (365) for an activation command and performs the find-in-the-dark (FID) function using the battery life indicator (BLI) category determined during the previous on state. The control unit 220 also monitors the battery voltage level to determine if the open circuit voltage has dropped lower than the previously measured closed circuit voltage. As has been stated this may require a change in the indicated category of the battery status.

Figure 13:
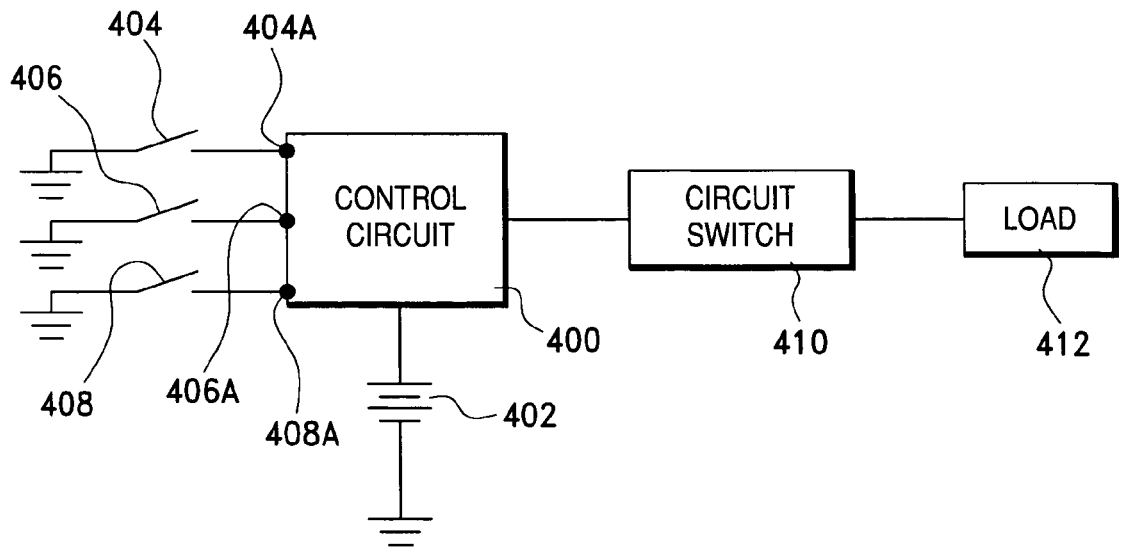
FIG. 13 illustrates a variation of the invention.

FIG. 13 illustrates a further aspect of the invention. In this case use is made of a control circuit or microchip 400 substantially of the kind described hereinbefore which is supplied with power from a battery 402. The control circuit has three signal switches 404, 406 and 408 respectively connected to respective inputs 404A, 406A and 408A. An output from the control circuit controls a current switch 410 which is used to connect power from the battery 402 to a load 412.

In this example of the invention the inputs 404A and 406A are referred to as main and mode inputs respectively and are edge triggered inputs. In other words these inputs are designed to work with non-latching input devices 404 and 406. As such, a first momentary activation of the respective signal switch 404 or 406, as the case may be, causes the control circuit 400 to interpret the input as an "on" command and a second activation will be interpreted as an "off" command.

By way of contrast the input 408 is a state triggered input. Thus a high input level is interpreted as an "on" command while a low input level is interpreted as an "off" command.

It is to be borne in mind that the levels referred to are merely by way of example and that the "on" and "off" commands can result from input signals at levels which are opposite to or different from what has been described.

Assume for example that the signal switch 408 is connected via a signal wire to the input 408A. The signal switch 408 may for example be a controller, such as a door-operated switch, in a vehicle which controls illumination inside the vehicle. For example when a door of the vehicle is opened the load 412, which is a lamp in the vehicle, is energised by the battery 402. In this configuration the switch 404 is installed, for example, at the point of illumination ie. near to the load 412.

The aforementioned configuration eliminates the requirement for a current carrying lead or wire from the signal switch 408 to the load 412 ie. a wire which can carry the full load current drawn by the lamp 412. This reduces the weight and cost of the lighting installation.

It is important that a signal from the switch 404 to the input 404A can override an input from the signal switch 408 to the input 408A, but not vice versa. Thus with the light 412 on due to a high input provided by the signal switch 408 an activation of the switch 404 will turn the light off. However if the light is on due to a command which has previously been input from the switch 404 to the input 404A a high level resulting at the input 408A by activation of the signal switch 408 will not affect the light condition and neither will a subsequent low input at the input terminal 408A.

The control circuit 400 will turn the light 412 off after an on period of a defined duration, for example 30 minutes or an hour, depending on requirement, irrespective of which input caused the on condition.

The mode input 406A exhibits the same protocol or hierarchy as does the main input 404A with regards to the input 408A. Thus a signal input via the switch 406 will override a state previously determined by an input from the switch 408, but not vice versa. A signal applied to the mode input can be used to reduce the power to the light by causing the duty cycle to be reduced and this will result in the light dimming.

Figure 14:
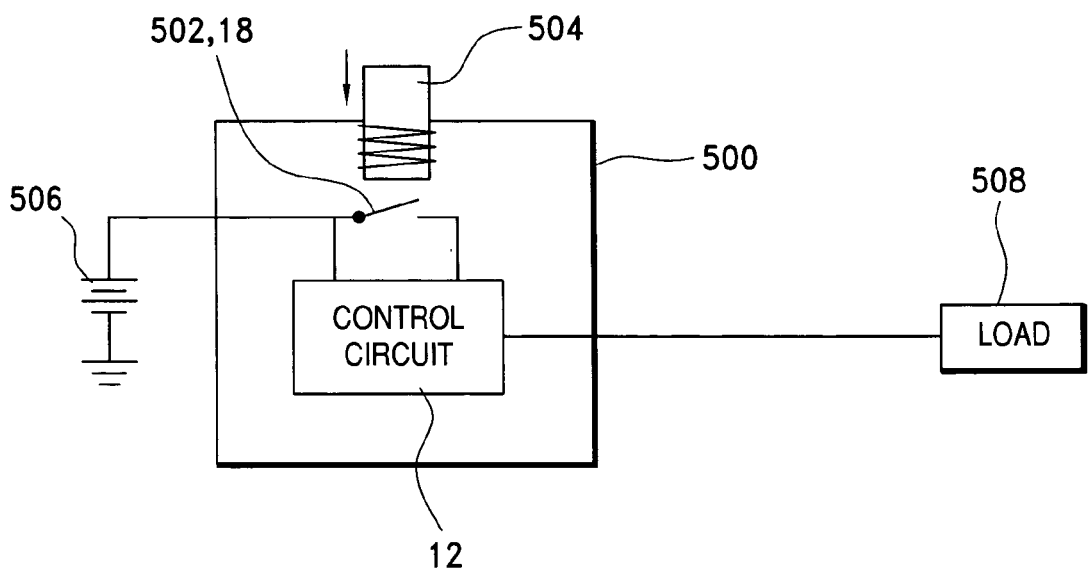
FIG. 14 shows a way of packaging the circuit of the invention.

A further aspect of this invention is shown in FIG. 14 which depicts, somewhat schematically, a housing 500 of a conventional electromechanical switch 502 operated via a button 504 The microchip or control circuit 12, eg. of the type shown in FIG. 2, is packaged inside the housing 500. The switch 502 acts as a signal switch 18 and controls the connection of a power supply 506 to a load 508. In other respects the circuit acts in the manner described hereinbefore. The switch 502 may vary according to requirement and for example may be a pushbutton switch (push-to-make release-to-break; eg. Carling switch P27L13L), a toggle switch (single pole double throw; eg. Arcolectric V1722RO) or a rocker type switch (eg. Arcolectric PLC1522AA) Using the two wire mode the switch can be pin compatible albeit polarity sensitive, but can provide intelligent decision making actions.

What is claimed is:

1. A switching circuit for controlling the supply of power from an exhaustible power source to a load which includes a control circuit, a power switch which is controlled by the control circuit in response to signals from a man-machine-interface (MMI) and said power switch, when closed, connects the power source to the load, the MMI comprising at least a switch connected to at least one signal switch input of the control circuit, the switch does not form a serial element in a circuit that transfers power from the power supply to the load and wherein the control circuit further provides at least one function selected from the following functions:

(a) a power source level indication which is determined by comparing a fixed reference voltage to a closed circuit supply voltage and which is displayed to a user, even at times when the load has not been activated through the MMI; and (b) a function wherein the control circuit compares the voltage of the power source to a fixed reference voltage and, in response to the comparison, controls a duty cycle of the power switch to provide a substantially constant supply of power from the power source to the load over a voltage range of the power source.

2. The switching circuit according to claim 1 wherein said function wherein the control circuit compares the voltage of the power source to a fixed reference voltage is selected and the level of said substantially constant supply of power is determined in accordance with a level selected through the MMI.

3. The switching circuit according to claim 1 wherein the control circuit monitors the voltage of the power source and when the power source voltage drops below an operating voltage of at least one element of the control circuit, the power switch is controlled directly by a signal at the signal switch input to connect the power source to load.

4. The switching circuit according to claim 1 wherein the power source level indicator also functions as a find-in-the-dark indicator.

5. The switching circuit according to claim 1 wherein the power source level indication is additionally based on a measurement of the level of the supply voltage when the power switch is not conducting.

6. The switching circuit according to claim 1 wherein the load is an electric motor and the duty cycle of the power switch is controlled to achieve a substantially constant operation of the motor over a range of power source levels.

7. The switching circuit according to claim 1 wherein the load is a lighting element and the duty cycle of the power switch is controlled to achieve a substantially constant illumination level of the lighting element over a range of power source levels.

8. The switching circuit according to claim 1 wherein the power source level indication additionally gives an indication of a selected function or mode of the control circuit.

9. The switching circuit according to claim 1 wherein said circuit is packaged within a housing of a conventional electromechanical switch.

10. The switching circuit according to claim 1 wherein the substantially constant power supplied to the load is achieved by stepping up the input voltage to a higher voltage for the load.

11. The switching circuit according to claim 1 wherein the control circuit provides at least one further function in response to a sequence of activation signals at the signal switch input.

12. The switching circuit according to claim 11 wherein the sequence of activation signals is changed dynamically to select "off" on the next activation or deactivation signal once any specific selection from the functions has been active for a predetermined period of time.

13. The switching circuit according to claim 1 wherein the control circuit monitors the voltage of the power source at predetermined intervals in the "on" and in the "off" state of the power switch.

14. The switching circuit according to claim 13 wherein a load is automatically connected to the power source before the voltage of the power source is measured.

* * * * *